United States Patent [19]

Howe et al.

[11] 4,302,413

[45] Nov. 24, 1981

[54] PROCESS FOR PREPARING EXTRUDABLE POLYIMIDE GRANULES

[75] Inventors: David M. Howe, Abington; Jeffrey B. Otto; Richard T. Traskos, both of Brooklyn, all of Conn.

[73] Assignee: Rogers Corporation, Rogers, Conn.

[21] Appl. No.: 961,095

[22] Filed: Nov. 16, 1978

[51] Int. Cl.³ ............................................. B27J 5/00
[52] U.S. Cl. ............................... 264/126; 264/141; 264/176 R; 264/211; 264/323; 264/331.19; 264/331.14
[58] Field of Search .............. 264/140, 126, 323, 337, 264/331, 211, 147, 176 R, 570, 126, 127, 119, 142, 109, 141

[56] References Cited

U.S. PATENT DOCUMENTS

| | | | |
|---|---|---|---|
| 3,259,676 | 7/1966 | Battista | 264/140 |
| 3,413,394 | 11/1968 | Jordan | 264/126 |
| 3,422,061 | 1/1969 | Gall | 264/109 |
| 3,573,132 | 3/1971 | Ducloux et al. | 264/109 |
| 3,573,260 | 3/1971 | Morello | 264/331 |
| 3,642,976 | 2/1972 | Buckley et al. | 264/323 |
| 3,644,287 | 2/1972 | Odier et al. | 264/331 |
| 3,644,288 | 2/1972 | Odier et al. | 264/331 |
| 3,663,674 | 5/1972 | Holiday | 264/118 |
| 3,671,490 | 6/1972 | Bargain | 264/331 |
| 3,708,459 | 1/1973 | Lubowitz | 264/331 |
| 3,714,320 | 1/1973 | Shaw | 264/323 |
| 3,763,103 | 10/1973 | Newton et al. | 264/331 |
| 3,772,418 | 11/1973 | Johnson | 264/331 |
| 3,822,177 | 7/1974 | Moked | 264/126 |
| 3,846,522 | 11/1974 | Goldman | 264/126 |
| 3,932,574 | 1/1976 | Shiraishi et al. | 264/147 |
| 3,988,401 | 10/1976 | Kasting et al. | 264/126 |
| 4,014,965 | 3/1977 | Stube et al. | 264/126 |
| 4,016,140 | 4/1977 | Morello | 264/331 |
| 4,056,594 | 11/1977 | Carrow | 264/176 R |
| 4,122,135 | 10/1978 | Valoti et al. | 264/140 |
| 4,146,668 | 3/1979 | Dorey et al. | 264/258 |
| 4,161,502 | 7/1979 | Wessling et al. | 264/126 |

*Primary Examiner*—Jay H. Woo
*Attorney, Agent, or Firm*—Fishman and Van Kirk

[57] ABSTRACT

A process for the preparation of extrudable polyimide granules comprising heating and compacting a powder containing polyimide particles to form a partially densified porous mass and crushing the mass to form granules which may be ram extruded to give uniform articles of high strength.

14 Claims, No Drawings

PROCESS FOR PREPARING EXTRUDABLE POLYIMIDE GRANULES

BACKGROUND OF THE INVENTION (1) Field for the Invention

The present invention relates to a method of making ram extrudable granules comprising aromatic heterocyclic polymer particles, such as polyimide particles.

(2) Description of the Prior Art

Fabrication of useful articles from aromatic heterocyclic polymers, such as polyimides, by continuous extrusion processes has proven to be difficult to achieve. In fact, aromatic heterocyclic polymers generally are intractable and are difficult to fabricate by any continuous process. Articles which can be fabricated from aromatic heterocyclic polymers by continuous processing normally are lower in density and have properties much inferior to those articles that can be obtained by compression molding the polymer.

Compression molding is usually the only method which can be used to form thick articles of the intractable aromatic heterocyclic polymers. It would be highly desirable to form such polymers into usable articles of high density by a continuous processing technique, such as the ram extrusion method which is frequently used to continuously process polytetrafluoroethylene. In this ram extrusion method, an article of high density is formed by forcing particles of a powder through a heated tube having a nonvarying cross section by successive strokes of a reciprocating ram. If this extrusion method is used to form articles from aromatic heterocyclic polymers, the rates for forming the articles are very slow and the properties of the articles formed are much inferior to those obtained on compression molding the polymers. For example, when a 10 mm diameter rod is extruded from a thermoplastic polyimide polymer, the surface of the article tends to be rough and discontinuous. The material contains large voids and significant color variations, and the flexural strength is undesirably low. In addition, the powder is difficult to feed because of the low apparent density and the need to vent or exclude a large quantity of air, and volatiles given off on heating and compacting the polymer. If the extrusion rate is increased, the noted problems generally are increased, while even at extremely low extrusion rates, the problems are not eliminated and the resulting rod is porous and is low in flexural strength.

SUMMARY OF THE INVENTION

The present invention provides a method of making extrudable granules from aromatic heterocyclic polymers, such as polyimides, which granules can be readily continuously ram extruded to give a consolidated article with improved properties or properties equivalent to compression molded articles of the same polymer. The polymers used in the method of this invention include aromatic heterocyclic polymers having, as a recurring unit, heterocyclic rings containing at least one nitrogen atom. It is particularly preferred that polyimide polymers be used in the method of the present invention.

The polymers which can advantageously be used in the method of the present invention are characterized as being basically intractable but which flow to at least a slight extent under pressure and at temperatures above the polymer's melting point or glass transition temperature. The method comprises heating and compacting a powder containing aromatic heterocyclic polymer particles to form a partially densified mass and dividing the mass to form granules of polymer. During the heating and compacting step of the method, the polymer particles are compacted to provide a porous mass having an increased bulk density.

During the heating and compacting stage of the process, the polymer is heated to a temperature at which the polymer will soften. In the case of thermoplastic polyimides, the temperature of the polymer is raised from room temperature to between about 5° C. to about 100° C. above the polymer's glass transition temperature. The compacting is done under low to moderate pressure, that is, pressures between 5 and about 1,000 lb/sq. in. The simultaneous heating and compacting can be achieved by a number of different means, e.g. pressing of a layer of the polymer powder between the heated platens of a hydraulic press, clamping under mild pressure in a heated mold, ram extrusion under low back pressure, or passing the powder through the nip of a heated two roll compounding mill. The mass provided by heating and compacting the polymer is a porous mass that can be easily divided by any conventional means such as grinding or crushing. The granules provided may be continuously ram extruded at relatively high rates with the resulting articles having properties, for example, flexural strength and modulus and density, similar to those of articles compression molded from the same polymer.

Optionally, in addition to the aromatic heterocyclic polymer particles, the heated and compacted powder may contain up to about 75 weight percent filler material. The filler material may be added to improve particular properties, such as, for example, flexural strength, friction and wear properties, and density or may be added to improve the ability of process the powder, or may be added to lower cost. Examples of such additives are polytetrafluoroethylene polymer particles, graphite, $MoS_2$, silicone, silica, or glass particles.

DETAILED DESCRIPTION OF THE INVENTION

According to the present invention, granules comprising aromatic heterocyclic polymers, such as polyimides, are provided. Generally speaking, the present invention is directed to providing extrudable granules of polymers of the type that are relatively intractable, and which are not easily formed into thick articles by any continuous process. By ram extrudable it is meant that the granules can be continuously consolidated to form an article with density and properties similar to those achieved by hot compression molding. The polymers used in the method of the present invention are stable at temperatures ranging up to about 400° C.

The term "aromatic heterocyclic" polymer is meant to include polymers having a recurring structural unit having heterocyclic rings which include nitrogen. Such polymers include: for example, polyimides, polyamideimides, polybenzimidazoles, polyphenylquinoxaline, polyparabanic acid, poly (phenyl-s-triazine), polybenzimidazopyrollones, polyetherimides and polyimide-epoxy polymers of the type of U.S. Pat. No. 3,663,651, and mixtures thereof.

In a preferred form of the present invention, a thermoplastic polyimide powder is used to form the granules. The term polyimide polymers is used to define polymers having the following recurring structural units:

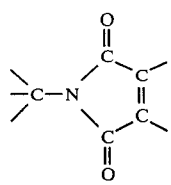

Examples of such thermoplastic polyimide polymers include: Upjohn's Polyimide 2080 and Ciba-Geigy's P13N and LSU 679.

The particularly preferred polyimide is Upjohn PI 2080, which is believed to be a copolyimide of the type described in U.S. Pat. No. 3,708,458, the polyimide having the following recurring structural unit:

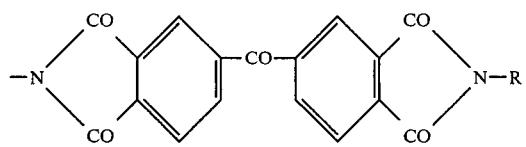

wherein 10 to 90 percent of the units, R represents

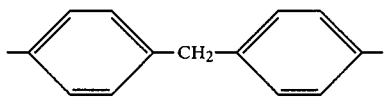

and the remainder of the units, R represents either:

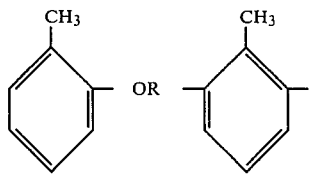

It has been determined that it is desirable for the particles in the powder to be quite fine. The fine particles allow for smoother ram extrusion of the compacted polymer granules and for the achievement of improved ultimate strength properties in the extruded article.

Preferably, the powder includes fine polymer particles having average diameters as determined by the Fisher Sub-Sieve Sizer below about 50μ, most preferably in the range about 1μ to about 10μ. Generally speaking, the powders have bulk densities in the range from about 125 to about 400 gm/liter.

In the process of the present invention, the polymer particle is heated and compacted to form a partially densified mass. The heating and compacting can be carried out on a layer of powder in a hydraulic press having heated platens. It should be understood that the heating and compacting of the powder may be done by a number of means, involving, that is, use of a 2 roll compounding mill or even of a ram extruder under a low back pressure. The temperature of the platens in a hydraulic press and the compaction pressure will depend on the specific type of polymer which is being formed into granules, but in general, the platens are heated to a temperature near or above the polymer's softening point.

It should be understood that the compaction pressure is dependent upon the type of polymer particle being compacted. It is preferred that the compaction pressure be in the range of about 5 and about 5,000 psi.

It is preferred that the polymer powder include at least about 25 weight percent aromatic heterocyclic polymer powder. Fillers may be added to the powder in amounts ranging up to 75 weight percent. The fillers may serve to modify the properties of an article formed from the granules produced by the method of the present invention. The fillers may also modify the processing properties of the powder and/or of the granules. The fillers include, for example, polytetrafluoroethylene polymer particles, graphite particles, molybdenum disulfide particles, silicone particles, silica and glass particles. The additives or fillers should be intimately mixed with the aromatic heterocyclic polymer powder by a conventional method, such as, for example, by powder blending using a high shear mixer.

In a preferred embodiment of the invention, the polymer powder comprises thermoplastic polyimide particles and the powder particles are simultaneously heated and compacted at a temperature between about 610° and about 650° F. and at a pressure of between about 5 and about 5,000 psi to thereby form a porous mass of polyimide polymer.

After heating and compaction, the porous mass is allowed to cool. Thereafter, the mass is divided into granules which may be used in different forming processes, but which are particularly suited for use in continuous processing by the ram extrusion method. The dividing of the mass can be accomplished by many conventional methods, such as, for example, grinding or crushing the mass. The mass may be divided into granules having a size which is particularly suited for the further processing of the polymer. In the case of ram extrusion, it is preferable to divide the mass into granules which are easily handled and fed into the extruder, such granules having diameters in the range from about 40 to about 400μ. It should be understood, however, that the granules provided may have a non-uniform diameter and shape.

EXAMPLE 1C

This example is a comparative example which illustrates the results when the polymer powder is not pre-compacted.

A thermoplastic aromatic heterocyclic polyimide polymer sold by the Upjohn Company as Polyimide 2080 was ball milled to provide particles having irregular shape and average size of 2 to 5μ (measured by Fisher Sub-Sieve Sizer). This powder exhibited a bulk density of about 170 g/l. A portion of the powder was blended with 2% by weight polytetrafluoroethylene powder L169A (from ICI) and was continuously ram extruded into a 10 mm diameter rod. The flexural strength of the rod was no greater than 11,000 psi. The rod produced in this manner had cyclic color variations corresponding to the individual powder charges and occasional faults and cracks at the intersection of the charges.

EXAMPLE 1

20 grams of the polyimide powder described above in Example 1C was placed on heated 8½"×11" platens of a hydraulic press and subjected to a compaction pressure of 200 lb/sq. in. for 3 minutes. During the compaction, the platens were maintained at a temperature of 620° F. After compaction, a porous mass of polymer was removed from the press and allowed to cool. Thereafter, the mass was ground in a hammer mill to produce a granular material of nonuniform particle size and shape. The bulk density of the granular produce after grinding is typically greater than about 400 gm/l and generally about 450 gm/l.

The granular product was ram extruded under conditions equivalent to those used during the extrusion of the powder mentioned above. The rod produced from this powder had an excellent uniform appearance, no faults or voids, and exhibited a flexural strength of 20,000 psi.

EXAMPLE 2

The polyimide powder described in Example 1C was passed through the 0.010" gap between the rolls of a two roll compounding mill. The rolls had been heated to a temperature of 650° F. The resulting partially compacted mass was hammer milled to form a granular product which was subsequently ram extruded to yield a 10 mm diameter rod of excellent uniform appearance. The rod exhibited a flexural strength of 16,000 psi.

EXAMPLE 3

A granular material was prepared by ram extruding at 620° F. at low pressure (100–1,000 psi) a dry blend of Upjohn Polyimide 2080 powder with 28% by weight polytetrafluoroethylene powder L169A from ICI, and subsequently hammer milling the porous extruded mass. The granular product was ram extruded under high pressure, 15,000 psi, and maximum temperature of 650° F. to yield a uniform color and density 10 mm diameter rod which exhibited flexural strength of about 8,200 psi.

EXAMPLE 3C

This example is a comparative example which illustrates the results when the polyimide powder is not pre-compacted.

If the blended powder of polyimide and polytetrafluoroethylene described in Example 3 is not first ram extruded under low pressure before the high pressure rod forming ram extrusion process, the resulting rod varies in color and density and contains large faults and voids such that the rod is so weak that it often separates when ejected from the extruder.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of making aromatic heterocyclic polymer granules particularly useful in continuous processes such as extrusion, the method comprising:
    heating and compacting a powder comprising aromatic heterocyclic polymer particles to form a mass; and
    dividing said mass to form granules of polymer.

2. A method according to claim 1 wherein the powder comprises polyimide particles.

3. A method according to claim 2 wherein the polyimide particles have a diameter below about 50μ.

4. A method according to claim 3 wherein the polyimide particles have a bulk density in the range from about 125 to about 400 gm/l.

5. A method according to claim 4 wherein the granules provided have a bulk density greater than about 400 gm/l.

6. A method according to claim 5 wherein said powder includes at least about 25 weight percent polyimide particles.

7. A method according to claim 6 wherein said powder includes up to about 75 weight percent filler.

8. A method according to claim 7 wherein dividing said mass comprises grinding said mass to form polymer granules.

9. A method according to claim 8 wherein the polymer particles are heated to a temperature between about 610° F. and 650° F.

10. The method of claim 1 wherein the powder is heated to above the glass transition temperature of the polymer during the step of heating and compacting.

11. The method of claim 1 wherein the step of heating and compacting comprises ram extrusion of the powder at a pressure in the range of 100 psi to 1000 psi.

12. The method of claim 10 wherein the step of heating and compacting comprises ram extrusion of the powder at a pressure in the range of 100 psi to 1000 psi.

13. The method of claim 12 wherein the polymer comprises polyimide and wherein said method further comprises the step of:
    mixing a filler in particulate form with the polymer particles prior to heating and compacting, the filler including a material selected from the group comprising polytetrafluoroethylene, graphite, molybdenum disulfide, silicone, silica, and glass.

14. The method of claim 13 wherein the step of mixing a filler with the polymer comprises dry blending.

* * * * *